UNITED STATES PATENT OFFICE.

WILHELM HASENBACH, OF MANNHEIM, GERMANY, ASSIGNOR TO VEREIN CHEMISCHER FABRIKEN, OF SAME PLACE.

METHOD OF MAKING SULFURIC ANHYDRID.

SPECIFICATION forming part of Letters Patent No. 681,698, dated September 3, 1901.

Application filed August 20, 1898. Serial No. 689,131. (No specimens.)

*To all whom it may concern:*

Be it known that I, WILHELM HASENBACH, a subject of the Emperor of Germany, and a resident of Mannheim, Germany, have invented certain new and useful Improvements in the Manufacture of Sulfuric Anhydrid, of which the following is a specification.

Endeavors have long been made to oxidize sulfurous acid arising from the roasting of pyrites, so as to form sulfuric anhyrid or sulfuric acid, use being made of the heat generated during the operation of roasting the pyrites and of an oxidizing agent; but no useful results have so far been obtained. According to the specification of British Letters Patent No. 1,919 of 1853, granted to William Hunt, the sulfurous acid arising from roasting fumes or gases of pyrites was proposed to be partly transformed into sulfuric acid by passing the sulfurous acid through a channel heated to a red heat by the roasting-gases, which passage was, if necessary, to contain pumice-stone or stone fragments or any other suitable material resisting the action of heat and acid. In his *Metallurgical Roasting Processes*, page 339, Plattner describes certain experiments in Freiberg, Germany, with the view to transforming the roasting-gases into sulfuric acid, broken quartz being used as a medium. In the year 1852 Wohler (*Ann. Chem. Pharm.* 81, p. 255) stated that oxids of copper, iron, chromium, and precipitated chromium and copper oxid are when kept at a moderate red heat capable of causing the combination of sulfurous acid and oxygen, so as to form sulfuric anhydrid. It is well known that roasting-gases from pyrites contain eight to ten per cent. of the sulfur in the form of sulfuric acid. In the *Ber. d. d. Chem. Ges.* (Vol. 1877, p. 1824) and others Lunge reports on a comparatively long series of experiments showing that sulfuric acid can be obtained amounting to from sixteen to eighteen per cent. maximum limit if a mixture of sulfurous acid and air be passed through a layer of pyrites waste products at a glowing heat. It has not so far been possible to so increase the formation of sulfuric anhydrid from $SO_2$ by causing the latter to act upon red-hot substances containing oxid of iron or to so increase the oxids quoted by Wohler in the treatise referred to as to admit of this reaction being practically utilized in manufacturing sulfuric anhydrid on a large scale.

I have recently discovered that sulfurous acid can be transformed into sulfuric anhydrid of about sixty per cent., and this yield, if the directions and conditions hereinafter stated be carefully observed, can be raised to upward of ninety per cent. Further, sulfurous acid can be freed from arsenic acid and other impurities in carrying out the process.

To obtain sulfuric anhydrid, it is essential that moisture should be entirely excluded from the air used for the oxidation and throughout the process. In order to accomplish these results, air is led over fresh pyrites, which are heated to a roasting heat, the admitted air having previously been thoroughly dried in some suitable way, as by means of concentrated sulfuric acid. In this roasting process sulfurous-acid gases generate which mingle with the admitted dried air, and this mixture of sulfurous-acid gas and dry air is then immediately and without cooling and without admission of any moisture from the outer air led over pyrites which have already been roasted or burned, (called "burnt ore,") and these exhausted or burnt pyrites, which mainly consist of iron oxid, are kept at a temperature like that at which the above-named mixture of acid and air leaves the roasting-chamber. The heated burnt ore serves as a catalytic contact substance, and under its influence not only is the sulfurous acid cleaned from its content of arsenic, (which unites with the burnt ore,) but also the sulfurous acid unites with the oxygen of the dry air present to form sulfuric anhydrid, which is then absorbed in the well-known manner by means of sulfuric acid. By this process sulfurous acid free from arsenic and sulfuric anhydrid also free from arsenic are obtained. The remainder of the sulfurous acid may again be led over the pyrites or burnt ore, where it is also converted into sulfuric anhydrid until the whole quantity of sulfurous acid is converted into anhydrid.

In carrying out this process it is necessary that a temperature such as is possessed by the gases discharged from the roasters, preferably a temperature varying between 600° and 700° centigrade, should be employed and that the contact substances be kept at this temperature during this process.

What I claim is—

1. The process herein described of making sulfuric anhydrid, which consists in first drying the air, then passing it over pyrites while they are being roasted, and immediately leading the resulting gases, while retaining the temperature imparted to them by the roasting process, over a suitable contact substance, thereby maintaining a temperature suitable for the production of sulfuric anhydrid.

2. The process herein described of making sulfuric anhydrid, which consists in first drying the air, then passing it over pyrites while they are being roasted, and immediately leading the resulting gases, while retaining the temperature imparted to them by the roasting process, over a suitable contact substance, thereby maintaining a temperature of substantially 600° to 700° centigrade suitable for the production of sulfuric anhydrid.

In testimony whereof I have signed my name to this specification in the presence of two subscribing witnesses.

WILHELM HASENBACH.

Witnesses:
   ALBERT SCHÜLE,
   CANNTER.